US012436927B2

(12) United States Patent
White et al.

(10) Patent No.: US 12,436,927 B2
(45) Date of Patent: Oct. 7, 2025

(54) STORAGE LOCATION METADATA FOR A DEDUPLICATION STORAGE SYSTEM

(71) Applicant: HEWLETT PACKARD ENTERPRISE DEVELOPMENT LP, Spring, TX (US)

(72) Inventors: Treeve White, Bristol (GB); Richard Phillip Mayo, Bristol (GB); Peter Thomas Camble, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 160 days.

(21) Appl. No.: 18/459,326

(22) Filed: Aug. 31, 2023

(65) Prior Publication Data
US 2025/0077489 A1 Mar. 6, 2025

(51) Int. Cl.
G06F 16/00 (2019.01)
G06F 16/215 (2019.01)
G06F 16/22 (2019.01)

(52) U.S. Cl.
CPC .......... G06F 16/215 (2019.01); G06F 16/22 (2019.01)

(58) Field of Classification Search
None
See application file for complete search history.

(56) References Cited

U.S. PATENT DOCUMENTS

| 8,370,297 | B2 | 2/2013 | Anglin et al. |
| 8,504,686 | B2 | 8/2013 | Phaal |
| 8,577,371 | B2 | 11/2013 | Arora et al. |
| 8,792,890 | B2 | 7/2014 | Abdel-Samad et al. |
| 9,204,373 | B2 | 12/2015 | Arora et al. |
| 9,317,218 | B1 | 4/2016 | Botelho et al. |
| 9,430,164 | B1 | 8/2016 | Botelho et al. |
| 10,365,974 | B2 | 7/2019 | Todd et al. |
| 11,182,256 | B2 | 11/2021 | Mayo et al. |
| 11,550,493 | B2 | 1/2023 | Falkinder et al. |
| 2012/0066375 | A1 | 3/2012 | Phaal |
| 2016/0026652 | A1* | 1/2016 | Zheng ............. G06F 16/137 707/692 |
| 2020/0073765 | A1 | 3/2020 | Tanwer et al. |
| 2021/0133174 | A1* | 5/2021 | Goswami ......... G06F 16/2246 |
| 2021/0367994 | A1 | 11/2021 | Pippin et al. |
| 2021/0389883 | A1 | 12/2021 | Derryberry et al. |
| 2023/0259488 | A1 | 8/2023 | Mayo et al. |
| 2024/0037034 | A1 | 2/2024 | Falkinder et al. |

* cited by examiner

Primary Examiner — Bai D Vu
(74) Attorney, Agent, or Firm — Trop, Pruner & Hu, P.C.

(57) ABSTRACT

Example implementations relate to deduplication operations in a storage system. An example includes receiving a stream of data units to be stored in a persistent storage of a deduplication storage system; generating a manifest to record a received order of the data units; indexing the data units in container indexes, where each container index records fingerprints and immutable storage locations of one or more data units; in response to a determination that the manifest has reached a threshold size, determining immutable storage locations that are recorded in the container indexes; and updating the manifest to record the determined immutable storage locations.

20 Claims, 7 Drawing Sheets

STORAGE LOCATION METADATA FOR A DEDUPLICATION STORAGE SYSTEM

BACKGROUND

Data reduction techniques can be applied to reduce the amount of data stored in a storage system. An example data reduction technique includes data deduplication. Data deduplication identifies data units that are duplicative, and seeks to reduce or eliminate the number of instances of duplicative data units that are stored in the storage system.

BRIEF DESCRIPTION OF THE DRAWINGS

Some implementations are described with respect to the following figures.

Figure 1:
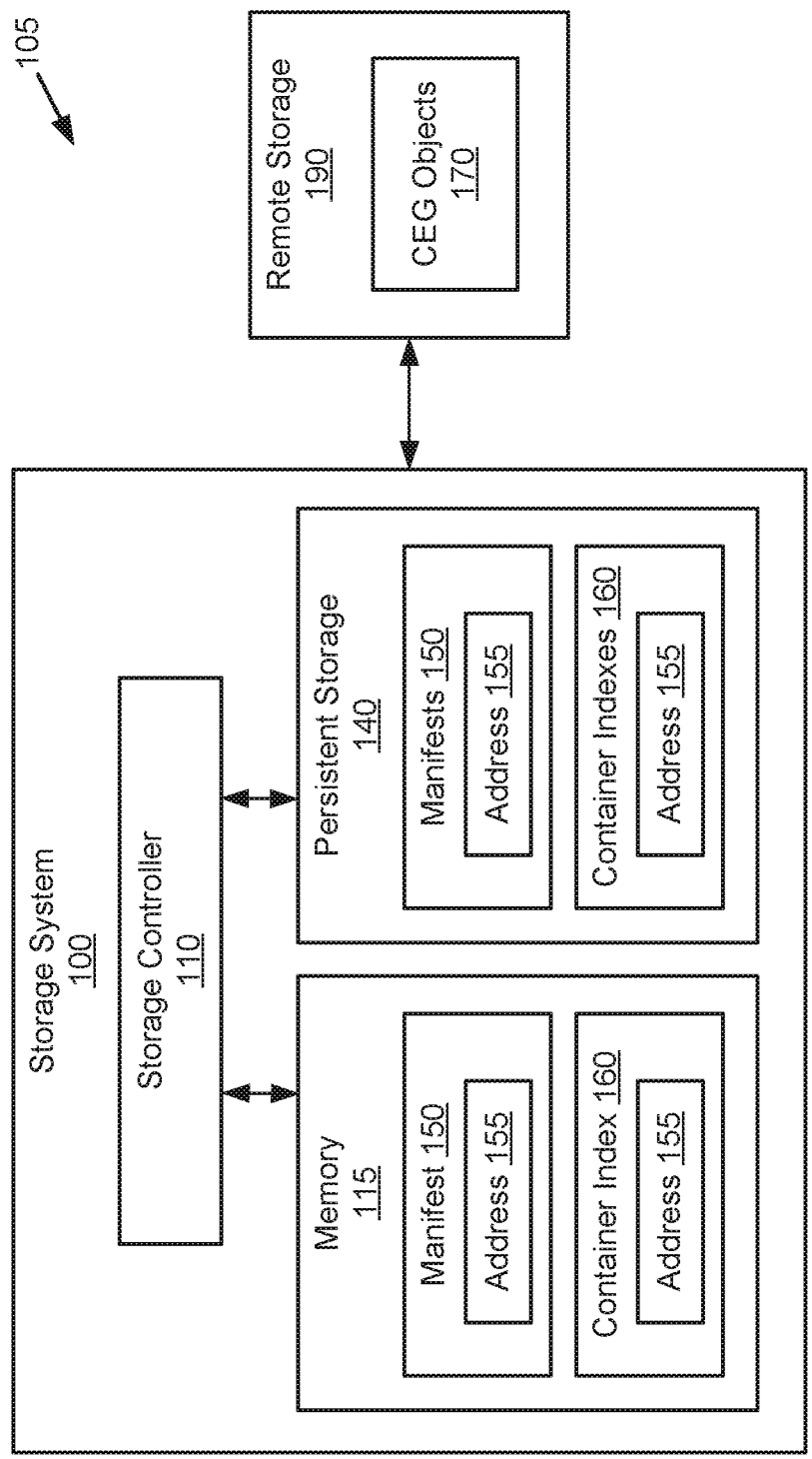
FIG. 1 is a schematic diagram of an example storage system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a storage system may back up a collection of data (referred to herein as a "stream" of data or a "data stream") in deduplicated form, thereby reducing the amount of storage space required to store the data stream. The storage system may create a "backup item" to represent a data stream in a deduplicated form. The storage system may perform a deduplication process including breaking a stream of data into discrete data units (or "chunks") and determining "fingerprints" (described below) for these incoming data units. Further, the storage system may compare the fingerprints of incoming data units to fingerprints of stored data units, and may thereby determine which incoming data units are duplicates of previously stored data units (e.g., when the comparison indicates matching fingerprints). In the case of data units that are duplicates, the storage system may store references to previously stored data units instead of storing the duplicate incoming data units. A process for receiving and deduplicating an inbound data stream may be referred to herein as a "data ingest" process of a storage system.

As used herein, the term "fingerprint" refers to a value derived by applying a function on the content of the data unit (where the "content" can include the entirety or a subset of the content of the data unit). An example of a function that can be applied includes a hash function that produces a hash value based on the content of an incoming data unit. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

A "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof. A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a deduplication storage system may use metadata for processing inbound data streams (e.g., backup items). For example, such metadata may include data recipes (also referred to herein as "manifests") that specify the order in which particular data units are received for each backup item. Further, such metadata may include item metadata to represent each received backup item (e.g., a data stream) in a deduplicated form. The item metadata may include identifiers for a set of manifests, and may indicate the sequential order of the set of manifests. The processing of each backup item may be referred to herein as a "backup process." Subsequently, in response to a read request, the deduplication system may use the item metadata and the set of manifests to determine the received order of data units, and may thereby recreate the original data stream of the backup item. Accordingly, the set of manifests may be a representation of the original backup item. The manifests may include a sequence of records, with each record representing a particular set of data unit(s). The records of the manifest may include one or more fields that identify container indexes that index (e.g., include storage information for) the data units. For example, a container index may include one or more fields that specify location information (e.g., containers, offsets, etc.) for the stored data units, compression and/or encryption characteristics of the stored data units, and so forth. Further, the container index may include reference counts that indicate the number of manifests that reference each data unit.

In some examples, upon receiving a data unit (e.g., in a data stream), it may be matched against one or more container indexes to determine whether an identical data unit is already stored in a container of the deduplication storage system. For example, the deduplication storage system may compare the fingerprint of the received data unit against the fingerprints in one or more container indexes. If no matching fingerprints are found in the searched container index(es), the received data unit may be added to a container, and an entry for the received data unit may be added to a container index corresponding to that container. However, if a matching fingerprint is found in a searched container index, it may be determined that a data unit identical to the received data unit is already stored in a container. In response to this determination, the reference count of the corresponding entry is incremented, and the received data unit is not stored in a container (as it is already present in one of the containers), thereby avoiding storing a duplicate data unit in the deduplication storage system. As used herein, the term "matching operation" may refer to an operation to compare fingerprints of a collection of multiple data units (e.g., from a particular backup data stream) against fingerprints stored in a container index.

In some examples, a deduplication storage system may store data units and associated metadata objects in a remote storage (e.g., a "cloud" or network storage service), rather than in a local filesystem. In such examples, processing a read request for a stored data unit may include loading the appropriate manifest from remote storage into memory, reading the manifest to identify the appropriate container index, loading the container index from remote storage into memory, reading the container index to determine the location in the remote storage that stores the data unit, and then loading the data unit from the location in the remote storage into memory. As such, performing read requests may include input/output (I/O) operations to load manifests, container indexes, and data units. Accordingly, completing the read requests may consume the network bandwidth and impact the processing performance of the deduplication storage system.

In accordance with some implementations of the present disclosure, a controller of a deduplication storage system may assign immutable storage locations to data units at initial ingest (e.g., when first received and stored), and may record the immutable storage locations in one or more container indexes loaded in memory. As used herein, an "immutable storage location" of a data unit may refer to a storage address that not changed after being assigned to the data unit. The controller may record the order in which the data units are received in a manifest loaded in memory. In some implementations, when the information recorded in a manifest reaches a threshold level (e.g., a maximum level), the controller may iterate through the container index(es) to extract the immutable storage locations of data units. When the data ingest process is completed (e.g., a backup process is completed), the controller may load the container indexes and manifests from memory into persistent storage, and may delete these items from the memory. Subsequently, in order to access a stored data unit (e.g., in response to a read request), the controller may load the appropriate manifest from persistent storage into memory. The controller may read the manifest to determine the immutable storage location of the data unit, and may then access the data unit using the immutable storage location. The controller may perform a read operation without having to load a container index from storage into memory (i.e., to determine the storage address of the data unit being accessed). In this manner, the number of data transfers from storage to memory may be reduced. Accordingly, some implementations may improve the performance of the deduplication storage system. Various aspects of the disclosed technique are discussed further below with reference to FIGS. 1-7

FIG. 1—Example Storage System

FIG. 1 shows an example system 105 that includes a storage system 100 and a remote storage 190. The storage system 100 may include a storage controller 110, memory 115, and persistent storage 140, in accordance with some implementations. The storage system 100 may be coupled to the remote storage 190 via a network connection. The remote storage 190 may be a network-based persistent storage facility or service (also referred to herein as "cloud-based storage"). In some examples, use of the remote storage 190 may incur financial charges that are based on the number of individual transfers.

The persistent storage 140 may include one or more non-transitory storage media such as hard disk drives (HDDs), solid state drives (SSDs), optical disks, and so forth, or a combination thereof. The memory 115 may be implemented in semiconductor memory such as random access memory (RAM). In some examples, the storage controller 110 may be implemented via hardware (e.g., electronic circuitry) or a combination of hardware and programming (e.g., comprising at least one processor and instructions executable by the at least one processor and stored on at least one machine-readable storage medium). In some implementations, the memory 115 may include manifests 150 and container indexes 160. Further, the persistent storage 140 may store manifests 150 and container indexes 160. The remote storage 190 may persistently store container entity group ("CEG") objects 170. Each CEG object 170 may be a container data structure configured to store multiple data units.

In some implementations, the storage system 100 may perform deduplication of the stored data. For example, the storage controller 110 may divide a stream of input data into data units, and may include at least one copy of each data unit in at least one of the CEG objects 170. The storage controller 110 may generate a manifest 150 to record the order in which the data units were received in the data stream. The manifest 150 may include a pointer or other information indicating the container index 160 that is associated with each data unit. In some implementations, the container index 160 may include a fingerprint (e.g., a hash) of a stored data unit for use in a matching process of a deduplication process. The container index 160 may also include a reference count of a data unit (e.g., indicating the number of manifests 150 that reference each data unit) for use in housekeeping (e.g., to determine whether to delete a stored data unit). Example implementations of a manifest 150, a container index 160, and a CEG object 170 are discussed further below with reference to FIGS. 2A-2B.

In some implementations, a container index 160 may include address information 155 to record or indicate the storage locations of data units for use in reconstruction of deduplicated data. Further, in some implementations, a manifest 150 may include the address information 155 for each data unit referenced by that manifest 150. For example, the address information 155 (e.g., stored in a container index 160 and in a manifest 150) may include an immutable address identifying the CEG object 170 that stores the data unit, and the location (within the CEG object 170) that stores the data unit. An example processes for storing the address information 155 in a manifest 150 is discussed below with reference to FIG. 3.

In some implementations, the storage controller 110 may receive a read request to access the stored data, and in response may access the manifest 150 to determine the sequence of data units that made up the original data. Further, the storage controller 110 may use the address information 155 included in the manifest 150 to determine the locations that store the data units (e.g., for each data unit, a respective CEG object 170, offset, etc.). In this manner, the storage controller 110 may determine the storage locations of the data units without loading the container index 160 into the memory 115. The storage controller 110 may then read the data units from the determined locations (e.g., by transferring the data units from the remote storage 190 to the memory 115. An example processes for performing a read request using the address information 155 in a manifest 150 is discussed below with reference to FIG. 4.

Note that, while FIG. 1 shows one example, implementations are not limited in this regard. For example, it is contemplated that some or all of the manifests 150 and container indexes 160 may be stored in the remote storage 190. In another example, it is contemplated that some or all of the CEG objects 170 may be stored in the persistent storage 140. In yet another example, it is contemplated that the memory 115, persistent storage 140, and/or remote storage 190 may include other data objects or metadata. Further, it is contemplated that the storage system 100 may include additional devices and/or components, fewer components, different components, different arrangements, and so forth.

Figure 2A:
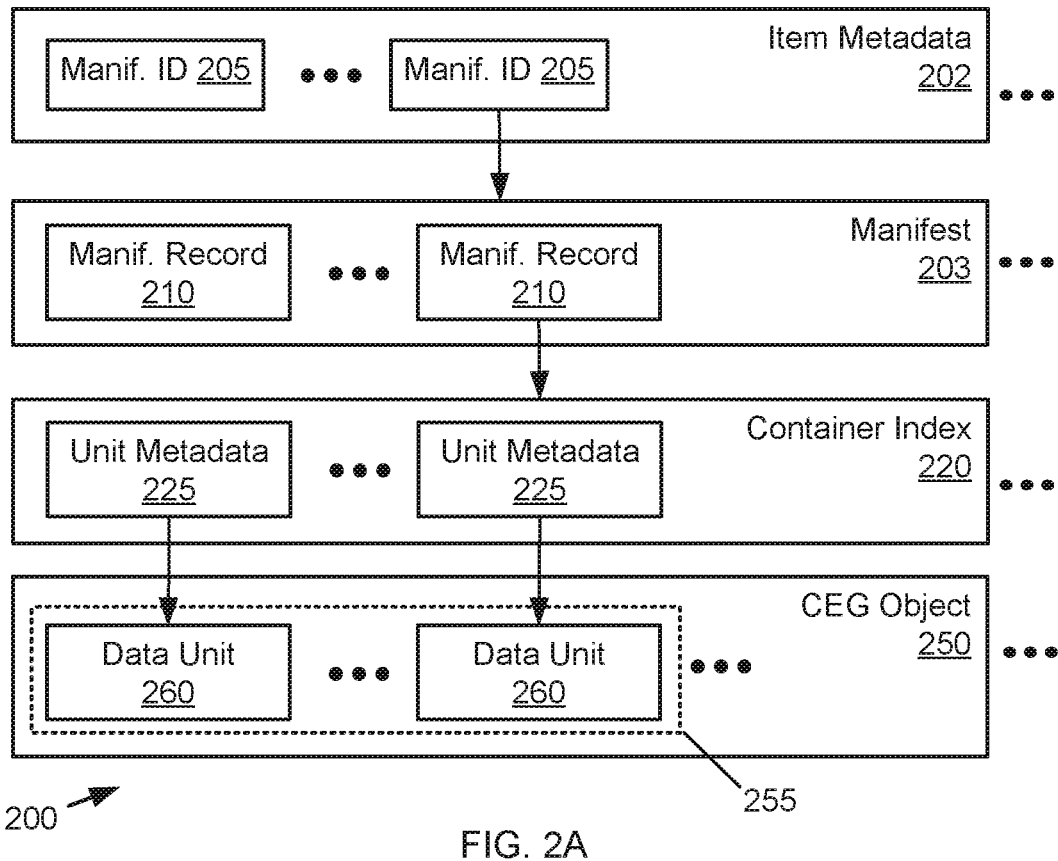
FIGS. 2A-2B are illustrations of example data structures, in accordance with some implementations.
Figure 2B:
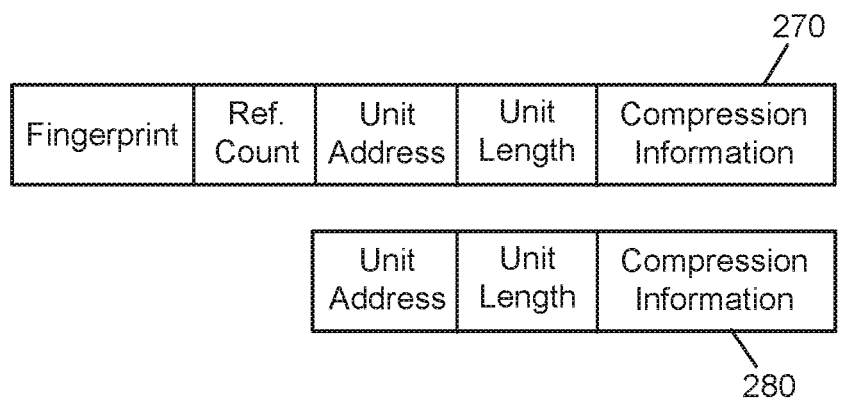

FIGS. 2A-2B—Example Data Structures

FIG. 2A shows an illustration of example data structures 200 used in deduplication, in accordance with some implementations. As shown, the data structures 200 may include item metadata 202, a manifest 203, a container index 220, and a container entity group ("CEG") object 250. In some examples, the manifest 203, the container index 220, and the CEG object 250 may correspond generally to example implementations of a manifest 150, a container index 160, and a CEG object 170 (shown in FIG. 1), respectively. Further, in some examples, the data structures 200 may be generated and/or managed by the storage controller 110 (shown in FIG. 1).

In some implementations, the item metadata 202 may include multiple manifests identifiers 205. Each manifests identifier 205 may identify a different manifest 203. In some implementations, the manifests identifiers 205 may be arranged in a stream order (i.e., based on the order of receipt of the data units represented by the identified manifests 203). Further, although one of each is shown for simplicity of illustration in FIG. 2A, data structures 200 may include a plurality of instances of item metadata 202, each including or pointing to one or more manifests 203. In such examples, data structures 200 may include a plurality of manifests 203. The manifests 203 may include a plurality of manifest records 210 that reference a plurality of container indexes 220. Each container index 220 may comprise a plurality of unit metadata 225. Each instance of unit metadata 225 may index one or more data units 260. Each CEG object 250 may comprise a plurality of data units 260. Further, in some examples, a CEG object 250 may include one or more groupings or "entities" 255, with each entity 255 including multiple data units 260.

Referring now to FIG. 2B, shown are container index metadata 270 and manifest metadata 280. In some implementations, the manifest metadata 280 may be included in a manifest 203 (e.g., in a manifest record 210). Further, the container index metadata 270 may be included in a container index 220 (e.g., in unit metadata 225). In some implementations, the container index metadata 270 and the manifest metadata 280 may each include a unit address, a unit length, and compression information. The unit address may be information stored in a field (or in a combination of multiple fields) that deterministically identifies the storage location of one or more data units. Further, the unit length may specify the data length of the data unit(s) stored at the unit address. In some implementations, the unit address of a data unit may be recorded as three values (e.g., stored in three fields) that respectively identify a particular CEG object 250, a particular entity 255, and an offset within the particular entity 255. In other implementations, the unit address may be a numerical value (referred to as the "arrival number") that indicates the sequential order of arrival (also referred to as the "ingest order") of data units being added to a deduplication storage system (e.g., system 105 shown in FIG. 1). In some implementations, the unit address in the manifest metadata 280 is not altered after being populated into the manifest metadata 280, and may thus represent an immutable address for the data unit.

In some implementations, the container index metadata 270 and/or the manifest metadata 280 may use a run-length reference format to represent a continuous range of data units (e.g., a portion of a data stream) that is stored within a single CEG object 250 (or within a single entity 255). For example, a unit address field may record the offset (in a CEG object 250) for the start of a first data unit in the data range being represented, and the unit length field may indicate the length of the data range being represented. In another example, a unit address field may record the arrival number of a first data unit in the data unit range being represented, and the unit length field may indicate a number N (where "N" is an integer) of data units, in the data unit range, that follow the first data unit specified by arrival number in the unit address field. The data units in a data unit range may have consecutive arrival numbers (e.g., because they are consecutive in an ingested data stream). As such, a data unit range may be represented by an arrival number of a first data unit in the data unit range (e.g., recorded in a unit address field) and a number N of further data units in the data unit range (e.g., recorded in a unit length field). The further data units in the data unit range after the first data unit may be deterministically derived by calculating the N arrival numbers that sequentially follow the specified arrival number of the first data unit, where those N arrival numbers identify the further data units in the data unit range. For example, the manifest metadata 280 may include an arrival number "X" in a unit address field and a number N in a unit length field, to indicate a data unit range including the first data unit specified by arrival number X and the following data units specified by arrival numbers X+i for i=1 through i=N, inclusive (where "i" is an integer). In this manner, the run-length reference format may be used to identify all data units in the data unit range.

In some implementations, the compression information may indicate how the stored data unit is compressed or decompressed (whether compression was used, type of compression code, type of decompression code, decompressed size, a checksum value, etc.). In some examples, during a read operation, the compression information may be used to decompress a requested data unit (or a particular entity 255 including the requested data unit).

In some implementations, the container index metadata 270 may include a fingerprint and a reference count. The fingerprint may be a value derived by applying a function (e.g., a hash function) to all or some of the content of the data unit. The reference count may indicate the total number of manifest records 210 that reference the data unit. Further, in some implementations, the fingerprint and a reference count may not be included in the manifest metadata 280.

Note that, while FIGS. 2A-2B show one example of the data structures 200, implementations are not limited in this regard. For example, it is contemplated that the item metadata 202, manifest 203, container index 220, and CEG object 250 may include additional fields or elements, additional data structures, and so forth. In another example, it is contemplated that the container index metadata 270 and/or the manifest metadata 280 may include additional fields or elements.

Figure 3:
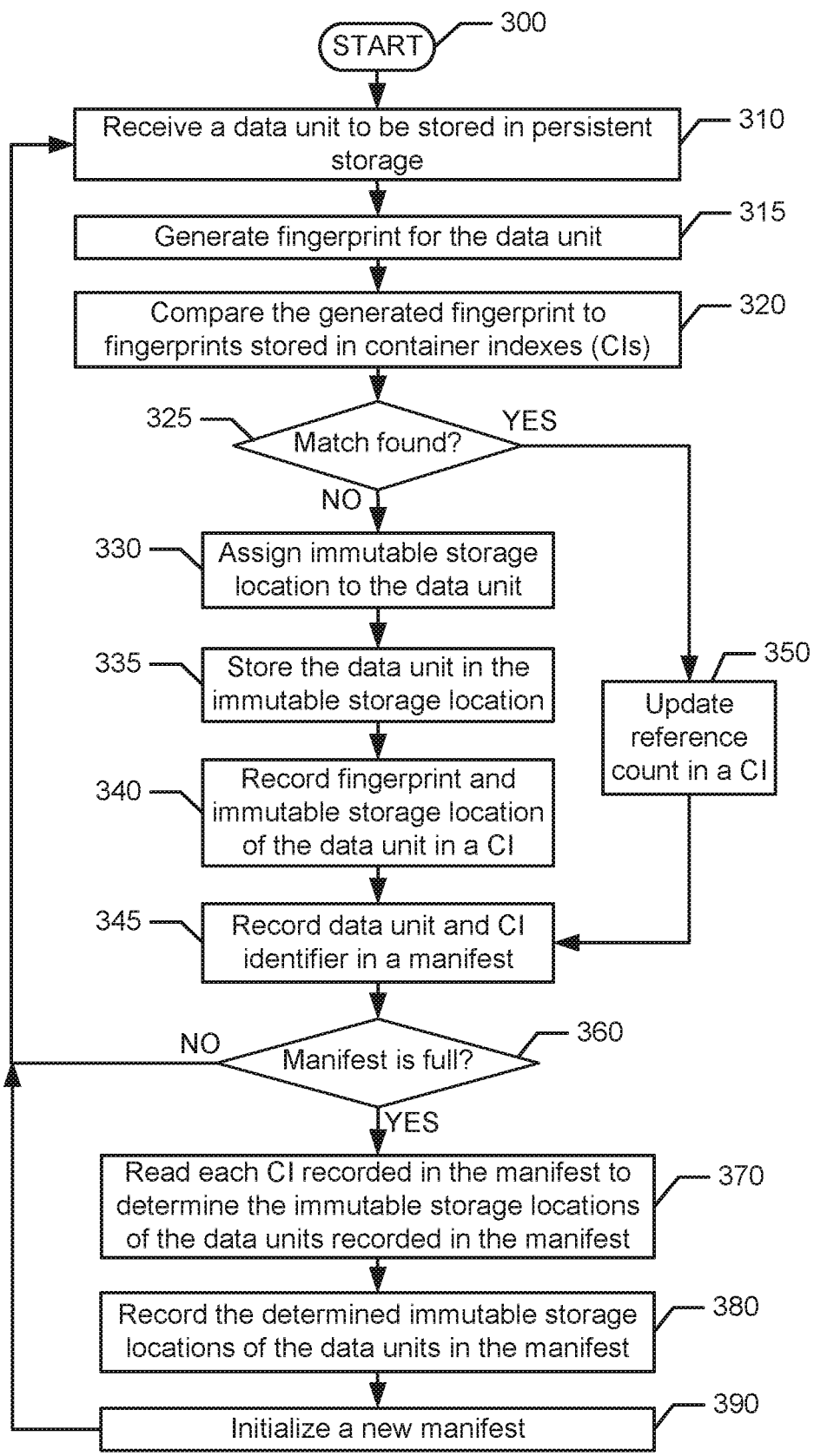
FIG. 3 is an illustration of an example process, in accordance with some implementations.

FIG. 3—Example Process for Generating Metadata

FIG. 3 shows is an example process 300 for generating metadata of a deduplication storage system, in accordance with some implementations. In some examples, the process 300 may be performed using the storage controller 110 (shown in FIG. 1). The process 300 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. In some implementations, the process 300 may be executed by a single processing thread. In other implementations, the process 300 may be executed by multiple processing threads in parallel (e.g., concurrently using the work map and executing multiple housekeeping jobs).

Block 310 may include receiving a data unit to be stored in a persistent storage of a deduplication storage system. Block 315 may include generating a fingerprint for the received data unit. Block 320 may include comparing the generated fingerprint to fingerprints stored in container indexes of the deduplication storage system. For example, referring to FIG. 1, the storage controller 110 receives a stream of data units (e.g., a backup item) to be stored in the system 105. The storage controller 110 generates fingerprints for the received data units, and compares the generated fingerprints to the fingerprints included in container indexes 160. Decision block 325 may include determining whether a match is found between the generated fingerprint and the fingerprints included in container indexes (CIs). If it is determined at decision block 325 that no match is found ("NO"), the process 300 may continue at block 330, including assigning an immutable storage location to the data unit. Block 335 may include storing the data unit in the assigned immutable storage location. Block 340 may include recording the fingerprint and the immutable storage location of the data unit in a container index. Block 345 may include recording the data unit and an identifier of the container index in a manifest. For example, referring to FIG. 1, if no match is identified between the generated fingerprint of the received data unit and the fingerprints included in container indexes 160, the storage controller 110 stores the data unit in an immutable storage location in a new CEG object 170. The storage controller 110 adds a new entry for the data unit to a container index 160. The new entry of the container index 160 may store container index metadata 270 (shown in FIG. 2B) including the fingerprint of the data unit, a reference count, unit address, unit length, and compression information.

However, if it is determined at decision block 325 that a match is found ("YES"), the process 300 may continue at block 350, including updating a reference count for the data unit in the container index that indexes that data unit. After block 350, the process 300 may continue at block 345, including recording the data unit and an identifier of the container index in a manifest. For example, referring to FIG. 1, if a match is identified between the generated fingerprint of the received data unit and a fingerprint stored in a particular container index 160, the storage controller 110 determines that a duplicate of the data unit is already stored in an existing CEG object 170. Accordingly, the storage controller 110 increments the reference count (corresponding to the data unit) in the particular container index 160. Further, the storage controller 110 records, in a current manifest 150, information identifying the data unit and the particular container index 160.

Decision block 360 may include determining whether the manifest is full (e.g., has reached a maximum number of entries representing data units). If not ("NO"), the process 300 may return to block 310 (i.e., to receive another data unit to be stored in persistent storage). Otherwise, if it is determined at decision block 360 that the manifest is full ("YES"), the process 300 may continue at block 370, including reading each container index recorded in the manifest to determine the immutable storage locations of the data units recorded in the manifest. Block 380 may include recording the determined immutable storage locations of the data units in the manifest. For example, referring to FIG. 1, upon determining that the current manifest 150 is full, the storage controller 110 accesses one or more container indexes 160 (e.g., loaded in memory 115) that index the set of data units recorded in the current manifest 150, and reads the container indexes 160 to obtain the address information 115 indicating the immutable storage locations of the set of data units. The storage controller 115 then stores the address information 115 for the set of data units in the manifest 150 (e.g., in manifest metadata 280 including a unit address, a unit length, and compression information).

In some implementations, the address information 155 for a continuous range of data units may be represented in a run-length reference format. For example, if a continuous range of data units is immutably stored within a single CEG object 250 (or within a single entity 255), the storage controller 110 may record the address information 155 for that range using a unit address field (storing the offset or arrival number of a first data unit in the range) and a unit length field (storing the number data units that follow the first data unit in the range). Subsequently, the address information 115 stored in the manifest 150 may be used to perform a read request without having to load a container index 160 into memory 115. An example processes for performing a read request using the address information 155 stored in the manifest 150 is discussed below with reference to FIG. 4.

Block 390 may include initializing a new manifest. After block 390, the process 300 may return to block 310 (i.e., to receive another data unit to be stored in persistent storage). Alternatively, the process 300 may be completed. For example, referring to FIG. 1, after storing the immutable storage locations of the identified set of data units in the manifest 150, the storage controller 110 initiates a new manifest 150 to record information regarding data units that are subsequently received.

Figure 4:
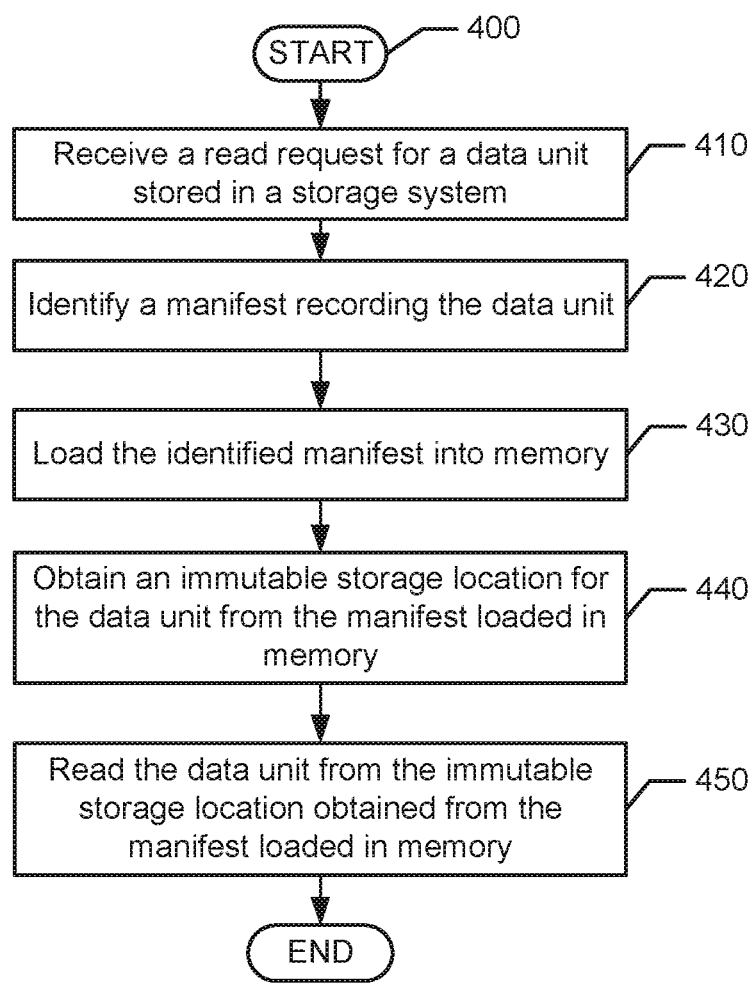
FIG. 4 is an illustration of an example process, in accordance with some implementations.

FIG. 4—Example Process for Performing a Read Request

FIG. 4 shows is an example process 400 for performing a read request in a deduplication storage system, in accordance with some implementations. In some examples, the process 400 may be performed using the storage controller 110 (shown in FIG. 1). The process 400 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. In some implementations, the process 400 may be executed by a single processing thread. In other implementations, the process 400 may be executed by multiple processing threads in parallel (e.g., concurrently using the work map and executing multiple housekeeping jobs).

Block 410 may include receiving a read request for a data unit stored in a deduplication storage system. Block 420 may include identifying a manifest recording the data unit. Block 430 may include loading the identified manifest into memory. For example, referring to FIG. 1, the storage controller 110 may receive a read request to access a data unit stored in the remote storage 190 (e.g., as part of a stored backup item). The storage controller 110 identifies a manifest 150 (in persistent storage 140) that references the requested data unit, and loads the manifest 150 into memory 115. Further, in some examples, the container index 160 that indexes the requested data unit is not loaded into memory 115 in response to the read request.

Block 440 may include obtaining the immutable storage location for the data unit from the manifest loaded in the memory. Block 450 may include reading the data unit from the immutable storage location obtained from the manifest loaded in the memory. After block 450, the process 400 may be completed. For example, referring to FIG. 1, the storage controller 110 reads the address information 155 stored in the manifest 150 (loaded in memory 115) to determine the immutable storage location of the requested data unit. The storage controller 110 then reads the requested data unit from the immutable storage location (e.g., in a CEG object 170 stored in remote storage 190). In this manner, the storage controller 110 performs the read request without having to load a container index 160 from the persistent storage 140 (or remote storage 190) into the memory 115. Accordingly, the process 400 may reduce the number of input/output (I/O) transfers required to perform read requests, and may thereby improve the performance of the storage system 100.

Figure 5:
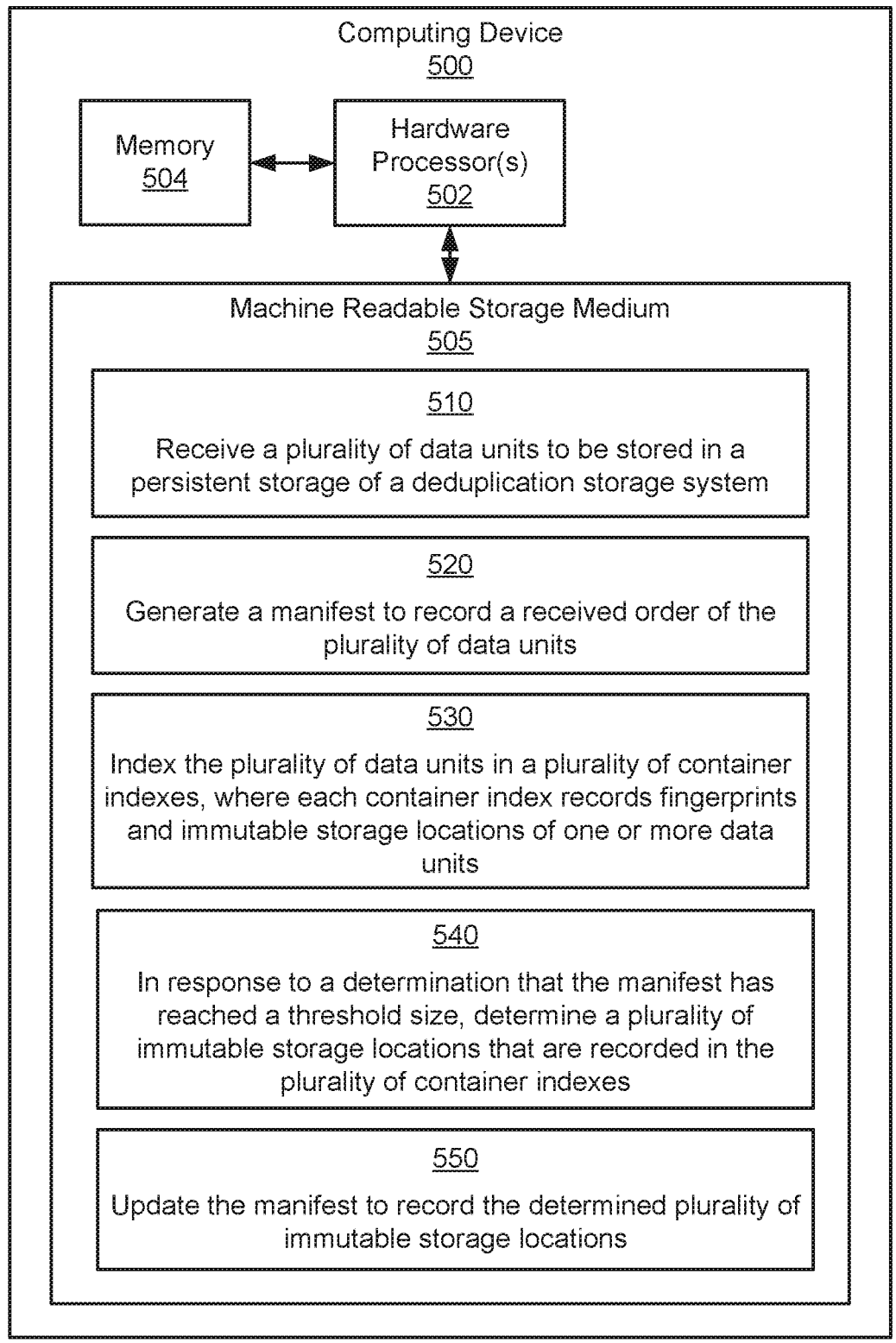
FIG. 5 is a schematic diagram of an example computing device, in accordance with some implementations.

FIG. 5—Example Computing Device

FIG. 5 shows a schematic diagram of an example computing device 500. In some examples, the computing device 500 may correspond generally to some or all of the storage system 100 (shown in FIG. 1). As shown, the computing device 500 may include a hardware processor 502, a memory 504, and machine-readable storage 505 including instructions 510-560. The machine-readable storage 505 may be a non-transitory medium. The instructions 510-560 may be executed by the hardware processor 502, or by a processing engine included in hardware processor 502.

Instruction 510 may be executed to receive a plurality of data units to be stored in a persistent storage of a deduplication storage system. Instruction 520 may be executed to generate a manifest to record a received order of the plurality of data units. For example, referring to FIG. 1, the storage controller 110 receives a stream of data units (e.g., a backup item) to be stored in the deduplication storage system 100, and records the intake order of the data units in a current manifest 150.

Instruction 530 may be executed to index the plurality of data units in a plurality of container indexes, where each container index records fingerprints and immutable storage locations of one or more data units. For example, referring to FIG. 1, the storage controller 110 generates fingerprints for the received data units, and compares the generated fingerprints to the fingerprints included in container indexes 160. If no match is identified between the generated fingerprint of a received data unit and fingerprints included in container indexes 160, the storage controller 110 stores the data unit in an immutable storage location in a new CEG object 170. Further, the storage controller 110 records information identifying the fingerprint and the immutable storage location of the data unit in a container index 160. Otherwise, if a match is identified between the generated fingerprint of the data unit and a fingerprint included in a container index 160, the storage controller 110 determines that a duplicate of the data unit is already stored in an existing CEG object 170. Accordingly, the storage controller 110 increments the reference count (corresponding to the data unit) in the particular container index 160. Further, the storage controller 110 records, in a current manifest 150, information identifying the data unit and the particular container index 160.

Instruction 540 may be executed to, in response to a determination that the manifest has reached a threshold size, determine a plurality of immutable storage locations that are recorded in the plurality of container indexes. Instruction 550 may be executed to update the manifest to record the determined plurality of immutable storage locations. For example, referring to FIG. 1, upon determining that the current manifest 150 is full, the storage controller 110 accesses one or more container indexes 160 (e.g., loaded in memory 115) that index the set of data units recorded in the current manifest 150, and reads the container indexes 160 to obtain the address information 115 indicating the immutable storage locations of the set of data units. The storage controller 115 then stores the address information 115 for the set of data units in the manifest 150 (e.g., in manifest metadata 280 including a unit address, a unit length, and compression information).

Figure 6:
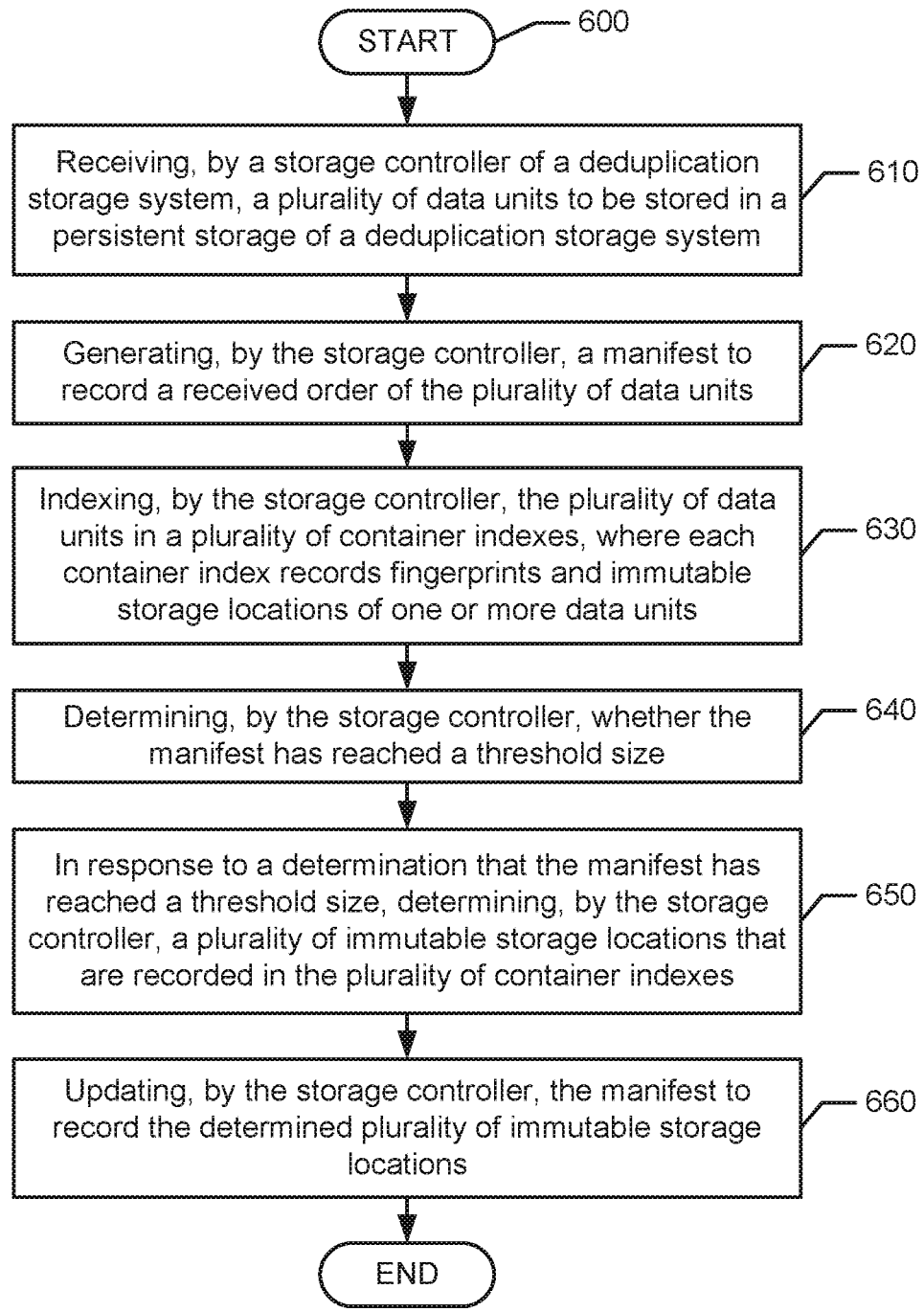
FIG. 6 is an illustration of an example process, in accordance with some implementations.

FIG. 6—Example Process for Generating Metadata

FIG. 6 shows is an example process 600 for generating metadata of a deduplication storage system, in accordance with some implementations. In some examples, the process 600 may be performed using the storage controller 110 (shown in FIG. 1). The process 600 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 610 may include receiving, by a storage controller of a deduplication storage system, a plurality of data units to be stored in a persistent storage of a deduplication storage system. Block 620 may include generating, by the storage controller, a manifest to record a received order of the plurality of data units. Block 630 may include indexing, by the storage controller, the plurality of data units in a plurality of container indexes, where each container index records fingerprints and immutable storage locations of one or more data units.

Block 640 may include determining, by the storage controller, whether the manifest has reached a threshold size. Block 650 may include, in response to a determination that the manifest has reached a threshold size, determining, by the storage controller, a plurality of immutable storage locations that are recorded in the plurality of container indexes. Block 660 may include updating, by the storage controller, the manifest to record the determined plurality of immutable storage locations. Blocks 610-660 may correspond generally to the examples described above with reference to instructions 510-550 (shown in FIG. 5).

Figure 7:
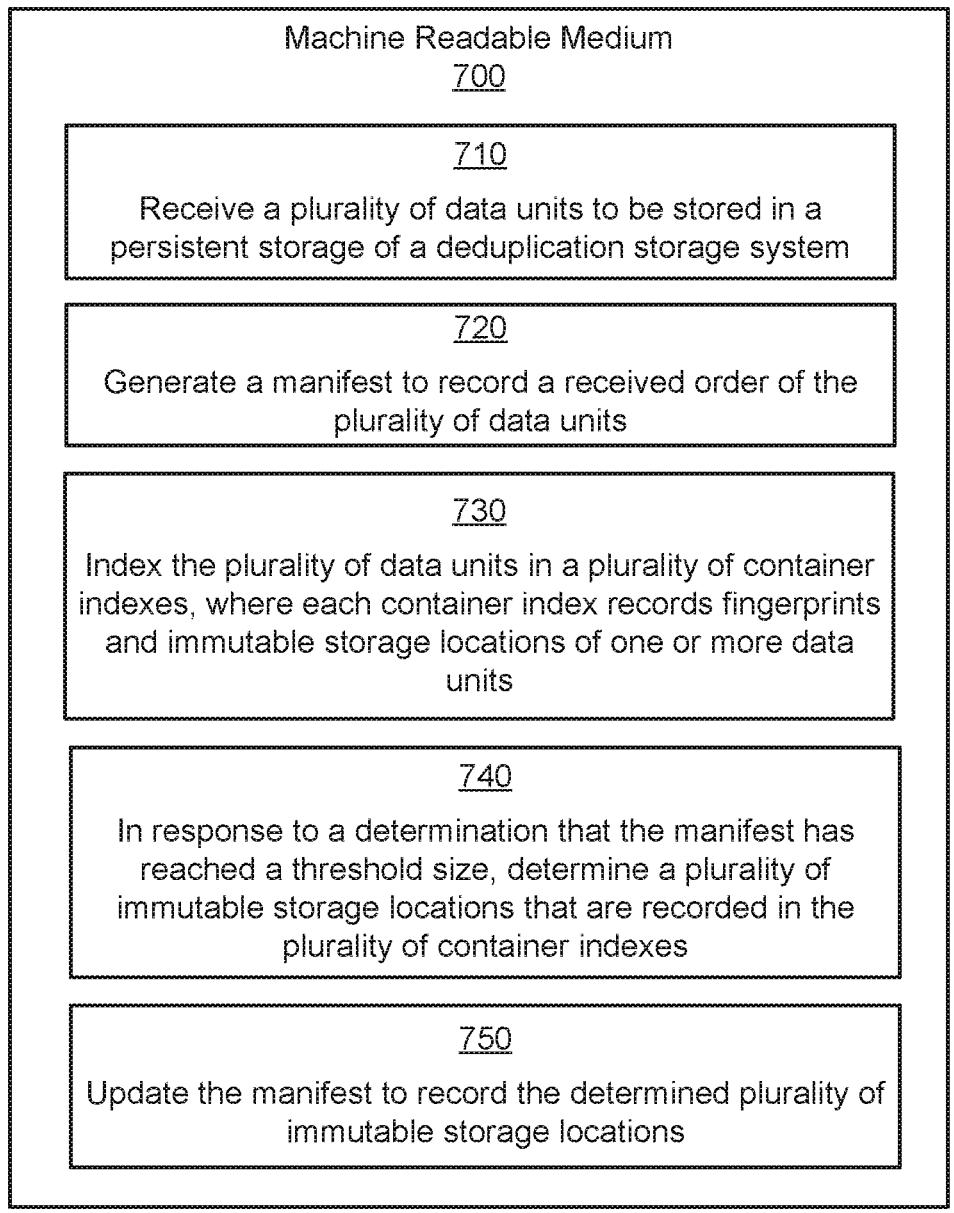
FIG. 7 is a diagram of an example machine-readable medium storing instructions in accordance with some implementations.

FIG. 7—Example Machine-Readable Medium

FIG. 7 shows a machine-readable medium 700 storing instructions 710-750, in accordance with some implementations. The instructions 710-750 can be executed by a single processor, multiple processors, a single processing engine, multiple processing engines, and so forth. The machine-readable medium 700 may be a non-transitory storage medium, such as an optical, semiconductor, or magnetic storage medium. The instructions 710-750 may correspond generally to the examples described above with reference to instructions 510-550 (shown in FIG. 5).

Instruction 710 may be executed to receive a plurality of data units to be stored in a persistent storage of a deduplication storage system. Instruction 720 may be executed to generate a manifest to record a received order of the plurality of data units. Instruction 730 may be executed to index the plurality of data units in a plurality of container indexes, where each container index records fingerprints and immutable storage locations of one or more data units.

Instruction 740 may be executed to, in response to a determination that the manifest has reached a threshold size, determine a plurality of immutable storage locations that are recorded in the plurality of container indexes. Instruction 750 may be executed to update the manifest to record the determined plurality of immutable storage locations.

In accordance with some implementations of the present disclosure, a controller of a deduplication storage system may assign immutable storage locations to data units at initial ingest, and may record the immutable storage locations in one or more container indexes loaded in memory. In some implementations, when the information recorded in a manifest reaches a threshold level, the controller may iterate through the container index(es) to extract the immutable storage locations of data units. Subsequently, in response to a read request, the controller may load the appropriate manifest from persistent storage into memory. The controller may read the manifest to determine the immutable storage location of the data unit, and may then access the data unit using the immutable storage location. The controller may perform a read operation without having to load a container index into memory. In this manner, the number of data transfers from storage to memory may be reduced. Accordingly, some implementations may improve the performance of the deduplication storage system.

Note that, while FIGS. 1-7 show various examples, implementations are not limited in this regard. For example, referring to FIG. 1, it is contemplated that the functionality of the storage controller 110 described above may be included in any another engine or software of storage system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computing device comprising:
   a processor;
   a memory; and
   a machine-readable storage storing instructions, the instructions executable by the processor to:
   receive a plurality of data units to be stored in a persistent storage of a deduplication storage system;
   generate a manifest to record a received order of the plurality of data units;
   index the plurality of data units in a plurality of container indexes, wherein each container index records fingerprints and immutable storage locations of one or more data units;
   in response to a determination that the manifest has reached a threshold size, determine a plurality of immutable storage locations that are recorded in the plurality of container indexes;
   update the manifest to record the determined plurality of immutable storage locations;
   in response to a read request for a particular data unit, determine a particular immutable storage location for the particular data unit using the updated manifest; and
   read the particular data unit from the particular immutable storage location determined using the updated manifest.

2. The computing device of claim 1, including instructions executable by the processor to, after updating the manifest to record the determined plurality of immutable storage locations:
   receive the read request for the particular data unit, wherein the particular data unit is included in the plurality of data units stored in the persistent storage;
   identify the updated manifest based on the read request for the particular data unit;
   load the identified updated manifest into the memory;
   determine, using the identified updated manifest loaded in the memory, the particular immutable storage location for the particular data unit; and
   read the particular data unit from the particular immutable storage location determined using the identified updated manifest loaded in the memory.

3. The computing device of claim 2, wherein the particular data unit is indexed by a particular container index, and wherein the particular container index is not loaded into the memory to perform the read request for the particular data unit.

4. The computing device of claim 1, including instructions executable by the processor to:
generate a first fingerprint for a first data unit included in the received plurality of data units;
compare the first fingerprint to fingerprints stored in the plurality of container indexes;
in response to a determination that no matches are found between the first fingerprint and the fingerprints stored in the plurality of container indexes:
assign a first immutable storage location to the first data unit;
store the first data unit in the first immutable storage location;
record the first fingerprint and the first immutable storage location in a first container index; and
record the first data unit and an identifier of the first container index in the manifest.

5. The computing device of claim 4, including instructions executable by the processor to:
in response to a determination that a match is found between the first fingerprint and a fingerprint stored in a second container index:
update, in the second container index, a reference count for the first data unit; and
record the first data unit and an identifier of the second container index in the manifest.

6. The computing device of claim 1, including instructions executable by the processor to:
after updating the manifest to record the determined plurality of immutable storage locations, initialize a new manifest.

7. The computing device of claim 1, including instructions executable by the processor to:
in response to determination that a continuous range of data units is stored within a single data object, record, in the manifest, a run-length reference value to indicate an immutable storage location of the continuous range of data units within the single data object.

8. The computing device of claim 7, wherein the single data object is a container entity group ("CEG") object stored on a cloud-based remote storage.

9. A method comprising:
receiving, by a storage controller of a deduplication storage system, a plurality of data units to be stored in a persistent storage of a deduplication storage system;
generating, by the storage controller, a manifest to record a received order of the plurality of data units;
indexing, by the storage controller, the plurality of data units in a plurality of container indexes, wherein each container index records fingerprints and immutable storage locations of one or more data units;
determining, by the storage controller, whether the manifest has reached a threshold size;
in response to a determination that the manifest has reached the threshold size, determining, by the storage controller, a plurality of immutable storage locations that are recorded in the plurality of container indexes;
updating, by the storage controller, the manifest to record the determined plurality of immutable storage locations;
in response to a read request for a particular data unit, determining, by the storage controller, a particular immutable storage location for the particular data unit using the updated manifest; and
reading, by the storage controller, the particular data unit from the particular immutable storage location determined using the updated manifest.

10. The method of claim 9, comprising, after updating the manifest to record the determined plurality of immutable storage locations:
receiving the read request for the particular data unit, wherein the particular data unit is included in the plurality of data units stored in the persistent storage;
identifying the updated manifest based on the read request for the particular data unit;
loading the identified updated manifest into the memory;
determining, using the identified updated manifest loaded in the memory, the particular immutable storage location for the particular data unit; and
reading the particular data unit from the particular immutable storage location determined using the identified updated manifest loaded in the memory.

11. The method of claim 10, wherein the particular data unit is indexed by a particular container index, and wherein the particular container index is not loaded into the memory to perform the read request for the particular data unit.

12. The method of claim 9, comprising:
generating a first fingerprint for a first data unit included in the received plurality of data units;
matching the first fingerprint against fingerprints stored in the plurality of container indexes;
in response to a determination that no matches are found between the first fingerprint and the fingerprints stored in the plurality of container indexes:
assigning a first immutable storage location to the first data unit;
storing the first data unit in the first immutable storage location;
recording the first fingerprint and the first immutable storage location in a first container index; and
recording the first data unit and an identifier of the first container index in the manifest.

13. The method of claim 12, comprising:
in response to a determination that a match is found between the first fingerprint and a fingerprint stored in a second container index:
updating, in the second container index, a reference count for the first data unit; and
recording the first data unit and an identifier of the second container index in the manifest.

14. The method of claim 9, comprising:
after updating the manifest to record the determined plurality of immutable storage locations, initializing a new manifest.

15. A non-transitory machine-readable medium storing instructions that upon execution cause a processor to:
receive a plurality of data units to be stored in a persistent storage of a deduplication storage system;
generate a manifest to record a received order of the plurality of data units;
index the plurality of data units in a plurality of container indexes, wherein each container index records fingerprints and immutable storage locations of one or more data units;
in response to a determination that the manifest has reached a threshold size, determine a plurality of immutable storage locations that are recorded in the plurality of container indexes;

update the manifest to record the determined plurality of immutable storage locations;
in response to a read request for a particular data unit, determine a particular immutable storage location for the particular data unit using the updated manifest; and
read the particular data unit from the particular immutable storage location determined using the updated manifest.

16. The non-transitory machine-readable medium of claim 15, including instructions that upon execution cause the processor to, after updating the manifest to record the determined plurality of immutable storage locations:
receive the read request for the particular data unit, wherein the particular data unit is included in the plurality of data units stored in the persistent storage;
identify the updated manifest based on the read request for the particular data unit;
load the identified updated manifest into the memory;
determine, using the identified updated manifest loaded in the memory, the particular immutable storage location for the particular data unit; and
read the particular data unit from the particular immutable storage location determined using the identified updated manifest loaded in the memory.

17. The non-transitory machine-readable medium of claim 16, wherein the particular data unit is indexed by a particular container index, and wherein the particular container index is not loaded into the memory to perform the read request for the particular data unit.

18. The non-transitory machine-readable medium of claim 15, including instructions that upon execution cause the processor to:
generate a first fingerprint for a first data unit included in the received plurality of data units;
compare the first fingerprint to fingerprints stored in the plurality of container indexes;
in response to a determination that no matches are found between the first fingerprint and the fingerprints stored in the plurality of container indexes:
assign a first immutable storage location to the first data unit;
store the first data unit in the first immutable storage location;
record the first fingerprint and the first immutable storage location in a first container index; and
record the first data unit and an identifier of the first container index in the manifest.

19. The non-transitory machine-readable medium of claim 18, including instructions that upon execution cause the processor to:
in response to a determination that a match is found between the first fingerprint and a fingerprint stored in a second container index:
update, in the second container index, a reference count for the first data unit; and
record the first data unit and an identifier of the second container index in the manifest.

20. The non-transitory machine-readable medium of claim 15, including instructions that upon execution cause the processor to:
after updating the manifest to record the determined plurality of immutable storage locations, initialize a new manifest.

* * * * *